(12) United States Patent
Leiber et al.

(10) Patent No.: US 11,554,765 B2
(45) Date of Patent: Jan. 17, 2023

(54) ACTUATION DEVICE FOR A HYDRAULIC ACTUATION SYSTEM, IN PARTICULAR A MOTOR VEHICLE BRAKE OR AN ELECTRIFIED CLUTCH ACTUATOR, OPTIONALLY WITH GEAR ACTUATOR

(71) Applicant: IPGATE AG, Pfäffikon (CH)

(72) Inventors: Heinz Leiber, Oberriexingen (DE);
Thomas Leiber, Rogoznica (HR);
Carsten Hecker, Munich (DE)

(73) Assignee: IPGATE AG, Pfaffikon (CH)

( * ) Notice: Subject to any disclaimer, the term of this patent is extended or adjusted under 35 U.S.C. 154(b) by 0 days.

(21) Appl. No.: 17/153,186

(22) Filed: Jan. 20, 2021

(65) Prior Publication Data
US 2021/0213924 A1    Jul. 15, 2021

Related U.S. Application Data

(63) Continuation of application No. 16/086,896, filed as application No. PCT/EP2017/056567 on Mar. 20, 2017, now Pat. No. 10,933,853.

(30) Foreign Application Priority Data

Mar. 21, 2016 (DE) .................... 10 2016 105 232.9

(51) Int. Cl.
*B60T 8/36* (2006.01)
*B60T 13/14* (2006.01)
(Continued)

(52) U.S. Cl.
CPC ............ *B60T 13/142* (2013.01); *B60T 8/368* (2013.01); *B60T 17/02* (2013.01); *F16D 2121/04* (2013.01); *F16D 2121/24* (2013.01)

(58) Field of Classification Search
CPC ...... B60T 8/368; B60T 8/4081; B60T 13/142; B60T 17/02
See application file for complete search history.

(56) References Cited

U.S. PATENT DOCUMENTS 7,322,658 B2 * 1/2008 Hinz ....................... B60T 8/368
303/DIG. 10
8,424,976 B2 4/2013 Dinkel et al.
(Continued)

FOREIGN PATENT DOCUMENTS

CN    101896382 A    11/2010
CN    104640755 A     5/2015
(Continued)

OTHER PUBLICATIONS

Office Action dated May 26, 2021 in Chinese Application No. 201780019150.9.
(Continued)

*Primary Examiner* — Thomas W Irvin
(74) *Attorney, Agent, or Firm* — Panitch Schwarze Belisario & Nadel LLP

(57) ABSTRACT

An actuation device for a hydraulic actuation system, e.g., a motor vehicle brake or an electrified clutch actuator, may include a connection for an actuation device; a pressure supply device, driven by an electromotor drive, in the form of a piston or double-stroke piston pump; a piston cylinder unit that may be actuated by means of the actuation device; and an electronic control unit. An axis of the piston cylinder unit and an axis of the pressure supply device may be arranged in parallel.

14 Claims, 4 Drawing Sheets

(51) Int. Cl.
*B60T 17/02* (2006.01)
*F16D 121/04* (2012.01)
*F16D 121/24* (2012.01)

(56) References Cited

U.S. PATENT DOCUMENTS

| | | |
|---|---|---|
| 8,979,218 B2 | 3/2015 | Drumm |
| 9,205,821 B2 | 12/2015 | Biller et al. |
| 9,308,905 B2 | 4/2016 | Biller et al. |
| 9,315,180 B2 | 4/2016 | Jungbecker et al. |
| 9,365,199 B2 | 6/2016 | Drumm |
| 9,446,753 B2* | 9/2016 | Feigel ............... B60T 13/66 |
| 9,663,077 B2 | 5/2017 | Kamiya et al. |
| 9,764,723 B2* | 9/2017 | Maruo ............... B60T 13/143 |
| 9,776,604 B2* | 10/2017 | Lee ................... B60T 7/042 |
| 9,845,085 B2 | 12/2017 | Besier et al. |
| 9,868,423 B2 | 1/2018 | Weh et al. |
| 9,914,443 B2 | 3/2018 | Masur et al. |
| 10,093,294 B2 | 10/2018 | Mayr et al. |
| 10,207,690 B2 | 2/2019 | Nakazawa et al. |
| 10,293,802 B2 | 5/2019 | Koga et al. |
| 10,308,232 B2 | 6/2019 | Mayr et al. |
| 10,407,040 B2 | 9/2019 | Jeon |
| 10,549,737 B2* | 2/2020 | Leiber ............... B60T 13/145 |
| 10,780,868 B2* | 9/2020 | Weh ................... B60T 8/368 |
| 2006/0016733 A1 | 1/2006 | Mainin et al. |
| 2008/0191547 A1 | 8/2008 | Weh et al. |
| 2008/0257670 A1 | 10/2008 | Drumm et al. |
| 2014/0203626 A1 | 7/2014 | Biller et al. |
| 2014/0216866 A1* | 8/2014 | Feigel ............... B60T 8/4081 |
| | | 188/156 |
| 2015/0035353 A1 | 2/2015 | Drumm |
| 2015/0061854 A1 | 3/2015 | Drumm et al. |
| 2015/0158474 A1 | 6/2015 | Matsunaga et al. |
| 2015/0203085 A1* | 7/2015 | Maruo ............... B60T 17/02 |
| | | 303/10 |
| 2015/0298675 A1* | 10/2015 | Mayr ............... B60T 8/4081 |
| | | 92/169.1 |
| 2016/0185329 A1* | 6/2016 | Lee ............... B60T 8/4081 |
| | | 303/10 |
| 2018/0056955 A1 | 3/2018 | Weh et al. |
| 2018/0065605 A1* | 3/2018 | Leiber ............... B60T 8/368 |
| 2018/0065609 A1* | 3/2018 | Leiber ............... B60T 8/368 |
| 2018/0257622 A1* | 9/2018 | Saito ................... B60T 13/66 |
| 2019/0210576 A1 | 7/2019 | Zander et al. |
| 2020/0031327 A1 | 1/2020 | Mayr et al. |
| 2020/0047731 A1* | 2/2020 | Reuter ............... B60T 13/745 |
| 2020/0114894 A1* | 4/2020 | Leiber ............... B60T 13/745 |
| 2020/0254989 A1* | 8/2020 | Kawakami ............ B60T 8/17 |

FOREIGN PATENT DOCUMENTS

| | | |
|---|---|---|
| DE | 102008063772 A1 | 6/2010 |
| DE | 102010040097 A1 | 3/2011 |
| DE | 102011017436 A1 | 10/2012 |
| DE | 102012212836 A1 | 2/2013 |
| DE | 102012213216 A1 | 2/2013 |
| DE | 102014205431 A1 | 10/2014 |
| DE | 102013111974 A1 | 4/2015 |
| DE | 102013226699 A1 | 6/2015 |
| DE | 112013004634 T5 | 6/2015 |
| DE | 102014225962 A1 | 6/2016 |
| EP | 2993095 A1 | 3/2016 |
| JP | S61089524 U | 6/1986 |
| JP | H09175376 A | 7/1997 |
| JP | 2000177560 A | 6/2000 |
| JP | 2002280110 A | 9/2002 |
| JP | 2010116145 A | 5/2010 |
| JP | 2014046853 A | 3/2014 |
| JP | 2014061816 A | 4/2014 |
| WO | 2011029812 A1 | 3/2011 |
| WO | 2013/136950 A1 | 9/2013 |
| WO | 2016023995 A1 | 2/2016 |

OTHER PUBLICATIONS

Office Action dated Aug. 4, 2020 in Chinese Application No. 201780019150.9.

Office Action dated Feb. 8, 2021 in Japanese Application No. 201854913.

Office Action dated Mar. 17, 2017 in German Application No. 102016105232.9 (no translation, shown for relevance).

Office Action dated Oct. 27, 2021 in Japanese Application No. 2018-549513.

Int'l Search Report (English Translation) dated Jul. 21, 2017 in Int'l Application No. PCT/EP2017/056567.

English Translation of International Preliminary Report on Patentability issued Oct. 4, 2018 in International Application No. PCT/EP2017/056567.

Office Action dated Apr. 28, 2020 in U.S. Appl. No. 16/086,896 by Leiber.

* cited by examiner

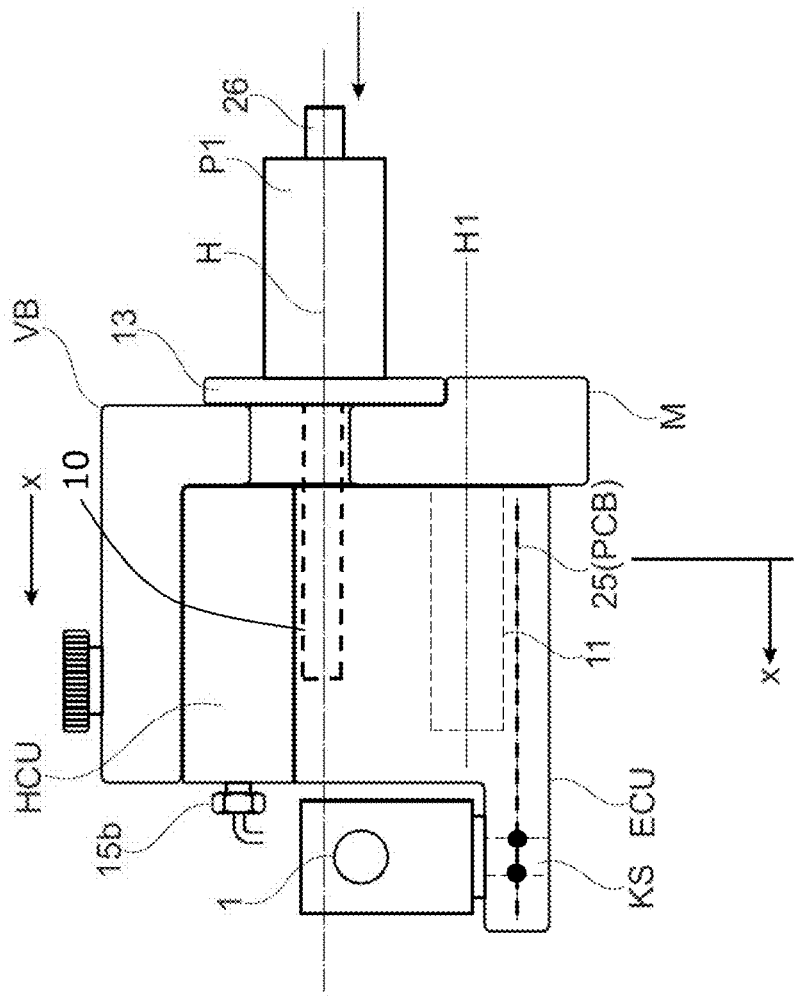
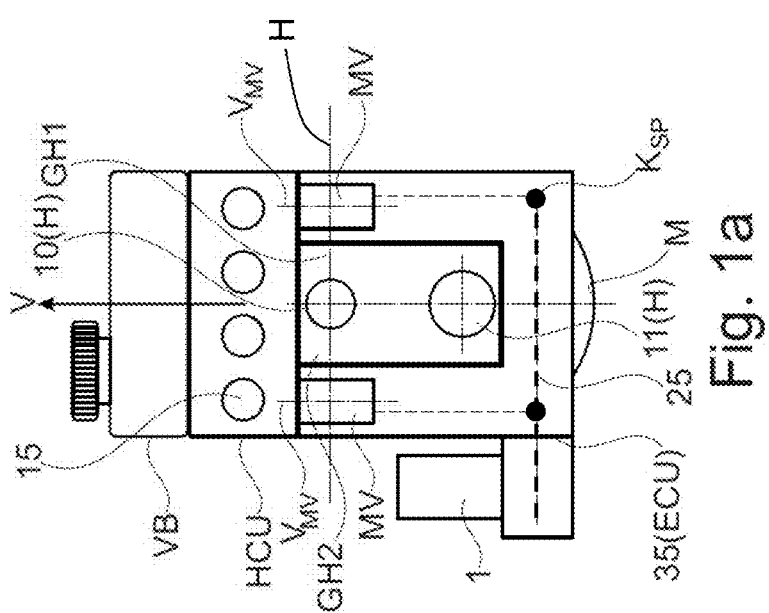
Fig. 1
Fig. 1a

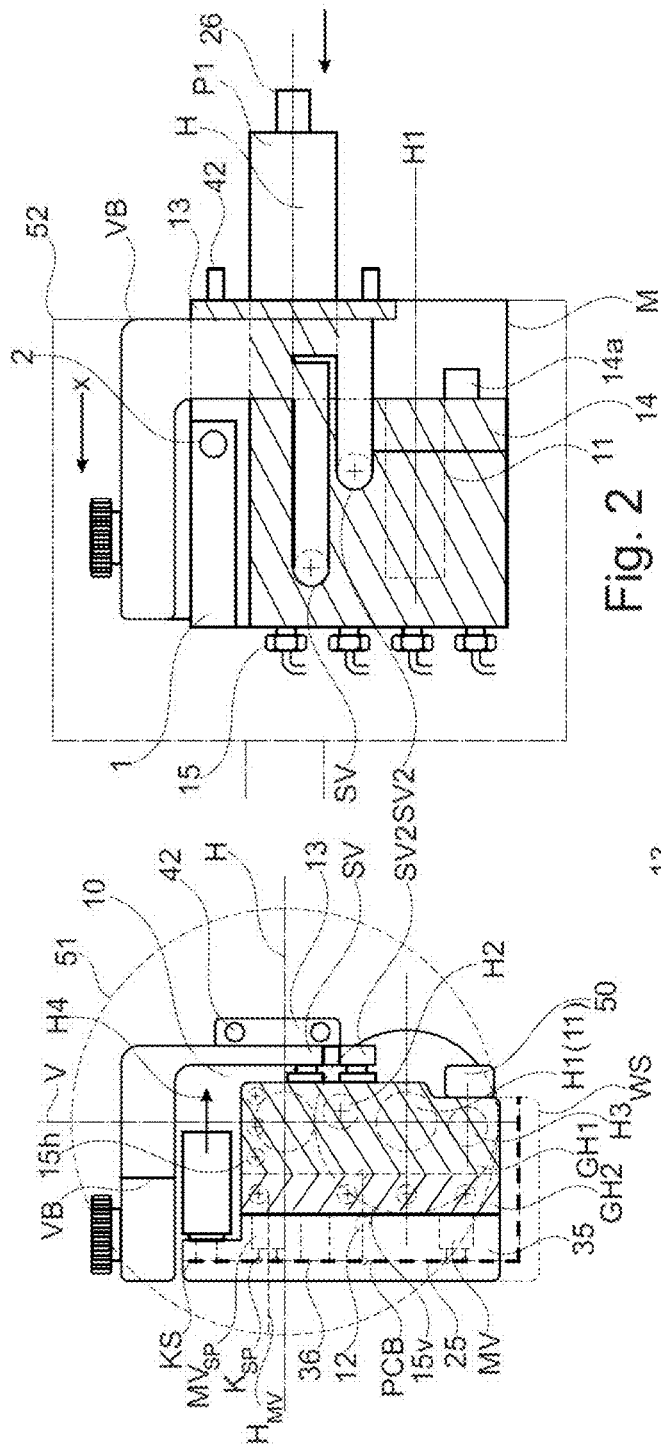
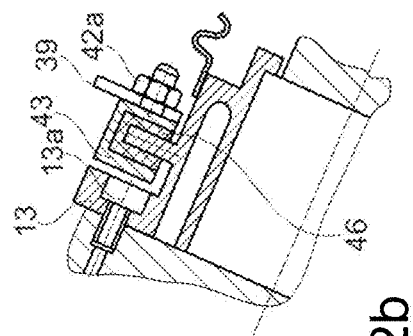
Fig. 2
Fig. 2a
Fig. 2b

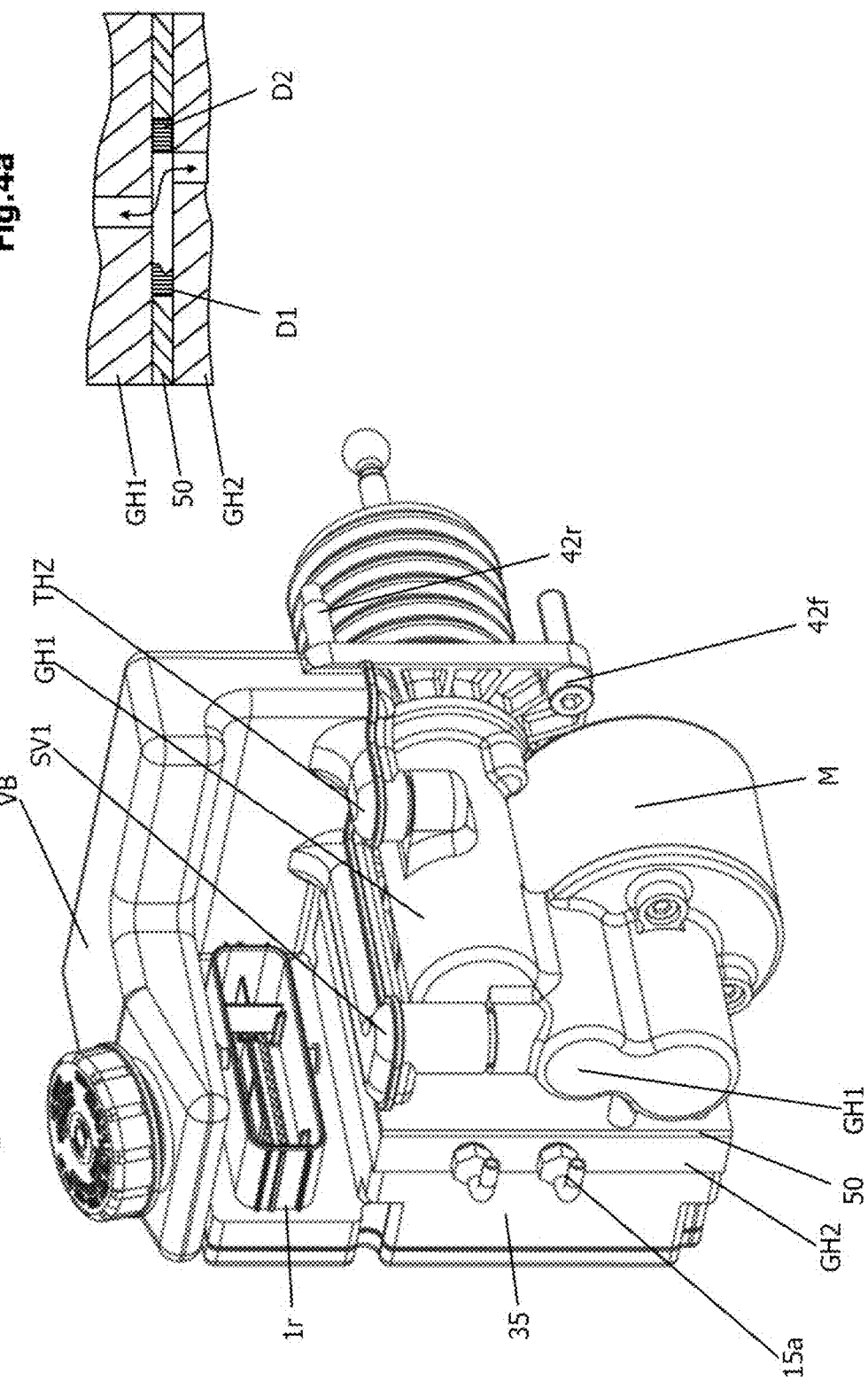

ACTUATION DEVICE FOR A HYDRAULIC ACTUATION SYSTEM, IN PARTICULAR A MOTOR VEHICLE BRAKE OR AN ELECTRIFIED CLUTCH ACTUATOR, OPTIONALLY WITH GEAR ACTUATOR

CROSS-REFERENCE TO RELATED APPLICATIONS

This application is a continuation of U.S. patent application Ser. No. 16/086,896, filed on Sep. 20, 2018, which is a U.S. national-stage application, under 35 U.S.C. § 371, of PCT International Patent Application No. PCT/EP2017/056567, filed on Mar. 20, 2017, which claims priority from Application 10 2016 105 232.9, filed on Mar. 21, 2016 in Germany. The entire contents of these applications are incorporated herein by reference in their entirety.

FIELD OF ENDEAVOR

The present invention relates to an actuation device for a hydraulic actuation system, in particular a motor vehicle brake or an electrified clutch and gear actuator.

BACKGROUND

In view of the many new systems being introduced by automotive manufacturers (OEMs), the installation of assemblies, in particular in the engine or unit compartment, increasingly presents problems due to the limited installation spaces. In some cases for example, the ABS unit is arranged behind the engine, in particular in front-wheel drives and transverse engine which means that the engine has to be removed when the ABS unit is replaced.

Therefore, the OEM is encouraging the existing units to be made smaller or new ones to be designed so as to be as compact as possible. In addition to this, there are right and left-hand drives, which for brake units means that the packaging should be the same.

Many units have electric functions and sensors which often require a plurality of plugs which is particularly complex in terms of installation.

The requirements for crash safety are also increasingly higher which means that the installation lengths of the systems in the unit compartment are supposed to be as short and narrow as possible, in particular when they are fastened to the front wall and adjacent units or control devices are attached to this installation unit.

As is well known, there is a strong trend in the case of brake systems of the solutions commonly known as "3-box solutions" nowadays, in the case of which brake boosters, ABS/ESP unit and vacuum pump form different assemblies which can also in particular be spatially separated to change to integrated "1 box solutions", in the case of which all components such as pressure supply, hydraulic (valve) unit (HCU), control unit (ECU) and main cylinder are integrated in one assembly. Such a compact "1-box brake system" is for example described in DE 10 2012 213 216. The main feature here is that the axis of the electric motor is perpendicular to the longitudinal axis of the first cylinder piston unit.

In the mid-1980s, with the Mark 2 Teves produced a semi-integrated solution with this feature, but also as a variant such that the axis of the E motor with pump was arranged parallel to the actuation axis. What is remarkable and different from the invention presented is that there is no integration of motor and pressure supply and ECU in one housing unit. The motor with the pump was added here and connected with hose lines to the housing made of valve block (HCU) and cylinder piston unit. The aim of a very narrow and short assembly was still not achieved.

A gear wheel drive of the motor target is described in DE 10 2011 017 436 as a sensor for the electric drive motor. The sensor element is arranged in a sensor module here which is connected to the system circuit board via a plug connection. Redundant pedal path sensors and a sensor for monitoring the fill level in the brake fluid container are also required.

In the case of a brake system described in DE 10 2012 213 216, a first cylinder piston arrangement actuated by the vehicle driver, a pressure supply device and a valve arrangement are arranged in the same housing, wherein the axis of the electric motor of the pressure supply device is arranged substantially perpendicular to the longitudinal axis of the first cylinder piston arrangement. A determined compactness is also ready aimed for with this solution which, can, however, still be further improved, in particular DE 10 2012 213 216 is designed on the spatial boundary conditions of a round contour of the conventional vacuum booster and does not consider the entire packaging optimisation in the vehicle. For optimal packaging, a rectangular construction is more opportune than a round contour. In particular, the adaptability to different installation situations also leaves something to be desired, for example installation in the engine compartment (so-called "front bolted" installation), in particular for electric brake boosters and electric brake boosters with integrated ABS which are installed on the bulkhead.

Additional requirements are:
short and narrow construction
good accessibility for installation of the hydraulic lines, in particular the brake lines to the wheel brakes
good accessibility for plugs, in particular of the main line set and short cable lengths to the motor vehicle distribution box (central electrics)
good ventilation properties not only in the end installation (with vacuum), but also in service (ventilation through pedal actuation)
short cable paths of the power cables from the plug to the power part of the motor control unit
good cooling and heat dissipation of the power part (end stages, MOSFET and driver)
reduction of noise of drive and solenoid valves, structure-borne noise transmission to the bulkhead
short holes from the THZ (tandem master cylinder), pressure delay to the HCU

OBJECT OF THE INVENTION

The object of the present invention is to provide the most compact, weight and cost-effective actuation device for hydraulic components, in particular for a motor vehicle brake, a hydraulic clutch or a gear actuator which is suitable to be used e.g. flexibly for different vehicles or installation situations.

Solution of the Problem

The object of the invention may be achieved by an actuation device with features as found in various ones of the attached claims.

The actuation device according to the invention is advantageously characterised in that it is compact and cost-effective, has a low weight and is furthermore flexible for different vehicles or installation situations. When it is used as an actuation device for a vehicle brake, it advantageously meets the following requirements and has the following advantages:

- short and narrow construction and optimal usable geometry for other components in the vehicle, in particular by way of the rectangular base form and good plug positioning;
- largely symmetrical design suitable for left-hand drives (LHD) and right-hand drives (RHD);
- good accessibility of the hydraulic and electrical connections for installation;
- mounting on the front wall (bulkhead) of the vehicle possible both from the engine (front bolted) as well as from the footwell;
- lowest possible costs and weight, inter alia, by short connection holes;
- modular design for different expansion stages, for example autonomous driving;
- high fail-safety;
- good ventilation properties;
- good cooling and heat dissipation from the PCB to the housing unit with high heat capacity;
- reduction of noise level by low structure-borne noise transmission into the passenger compartment;
- good handling in the case of installation and ventilation;
- Installation space is optimised for overall packaging for all components in the vehicle.

The invention is advantageously characterised in that the axis of the piston cylinder unit and the axis of the piston or double stroke piston pump of the pressure supply device are arranged parallel to one another and spaced from one another in the vertical direction, and in that the piston cylinder unit and the pressure supply unit are arranged in a first housing, wherein the drive is fastened to the first housing and arranged below the axis of the piston cylinder unit. In this case, an intermediate housing or element, in particular a sound-damping intermediate housing or element can still be arranged between the drive and the first housing. Insofar as the actuation device is used in a vehicle to regulate the pressure of its wheel brakes, the actuation device can be arranged in the engine compartment tilted at an angle φ of 5° to 30° to the vertical. By way of this advantageous design of the actuation device according to the invention, a particularly slim design results such that the actuation device according to the invention can be constructed so as to be very short and arranged in a space-saving manner e.g. in the engine compartment. In a vehicle, it is therefore advantageous for use in left-hand drive and right-hand drive vehicles.

In the case of a hydraulic system with few solenoid valves, pressure sensors (e.g. in the case of a clutch and gear actuator) or in a configuration without main brake cylinders (e.g. brake-by-wire hydraulic systems without main brake cylinders, hydraulic systems with few solenoid valves), in the sense of achieving an extremely narrow construction, the housing part (GH2), which contains the solenoid valves and pressure sensors, can also be arranged parallel to one another and spaced from one another in the vertical direction to the first housing part which comprises the pressure supply device. In this case, the solenoid valves are arranged perpendicular to the axis of the pressure supply device so that it is directly contacted by insertion from the ECU which contains the magnetic coils of the solenoid valves. This also has the advantage that the rotary encoder of the motor is at a small distance from the ECU and can be more easily contacted.

It is possible that the valve arrangement is arranged in a separate second housing or together in the first housing or is part of the first housing.

The electric connection between the circuit board of the control and regulating unit can be designed so as to be advantageously pluggable such that when the control and regulating unit is placed on the drive motor and the valve arrangement both the drive motor, sensor system and solenoid valves are contacted directly with the control and regulating unit. Additional cabling steps are advantageously hereby avoided.

The actuation device according to the invention can also be designed such that the majority or all the hydraulic components, in particular solenoid valves, pressure pistons, main brake cylinders are arranged in one hydraulic block. The hydraulic block can be designed in one or two parts in this case. In the case of a two-part configuration, the first housing and the second housing are advantageously connected to one another in a positive-locking or force-fitting manner. It also lends itself to arrange a so-called hydraulic circuit board between both housings which enables or implements the hydraulic connection, in particular the hydraulic components THZ, pressure supply, solenoid valves and pressure sensors. The thickness of the valve plate and the number of connection holes and sealing plugs can therefore be advantageously reduced. It is also advantageous for there to be good thermal transmission between both housings.

An advantageous configuration of the invention results when on the one side of the valve arrangement the pressure supply device and the piston cylinder unit are arranged and on the opposing side of the valve arrangement the electronic control and regulating unit is arranged. This sandwich-like arrangement advantageously enables a small, space-saving arrangement, wherein the housing of the electronic control and regulating unit and the valve arrangement have a width which is notably smaller than its height and depth.

The previously-described embodiment can be supplemented to the extent that the motor is arranged on the front side on a line consisting of electronic control and regulating unit, valve arrangement and the arrangement of pressure supply device and the piston cylinder unit arranged one on top of the other. A part of the housing of the electronic control and regulating unit can also be arranged above the valve arrangement and/or the first housing. It is also advantageously possible in this case for the reservoir to be arranged above the piston cylinder unit or above the part of the housing of the electronic control and regulating unit. In order to provide as few hydraulic connection cables as possible, the reservoir can be designed such that a region of the reservoir extends laterally downwards beside the first housing and this region has connections to connect inlet and outlet channels of the housing.

In an additional possible embodiment, the valve arrangement is advantageously arranged above the axis of the piston cylinder unit. A very small and good arrangement of all components of the actuation device according to the invention hereby also results. In the case of this configuration, it is particularly advantageous for the electronic control and regulating unit to be designed in the cross-section in an L or U shape and abut on two or three sides of the first housing. In particular, the U-shaped design of the electronic control and regulating unit is characterised by very simple electric connections between the components and good heat dissipation. The housing of the control and regulating unit comprises the first housing from below, wherein the two leg regions extending upwards laterally to the first housing extend upwards to the valve arrangement. A direct connection between valve arrangement and control and regulating unit is also hereby possible. The drive coils of solenoid valves can be housed in the control and regulating unit and the anchors and other hydraulic components of the solenoid valves can be housed in the valve arrangement.

In the case of the last-described embodiment, the motor of the pressure supply unit can, directly or via a part arranged therebetween, border at the front side on the electronic control and regulating unit. The contact between motor and control and regulating unit then advantageously takes place by means of plug contacts which establish the electric connection during installation of the components. Insofar as a housing is arranged between motor and the first housing or the control and regulating unit, this housing is advantageously made of a sound-damping material and/or has sound-damping properties which it has in particular also owing to its mechanical properties and geometric shape.

The parallel arrangement of motor and piston cylinder unit requires a short construction length such that both motor, pressure supply unit and its drive are constructed so as to be short. This is possible with e.g. a double stroke piston, stepped piston, unstepped piston and a so-called hollow shaft motor according to DE10 2008 063 772, in the case of which the spindle with ball screw drive, also called KGT, is arranged inside the rotor. The construction length, as shown later in FIG. 3, is therefore substantially determined only by the piston stroke and the ball screw drive nut.

In addition to the piston cylinder unit, the suction valves of the piston unit and the path simulators can also be housed in the first housing. The connection to the reservoir can also be implemented in the first housing.

Within the meaning of the invention, it is similarly possible for the valves to be arranged in a second housing or in the first housing corresponding to the system design. In this case, in particular solenoid valves and pressure sensors can be arranged in the second housing. The solenoid valves are necessary for pressure regulation in the hydraulic circuits, such as e.g. brake circuits, thus e.g. for the ABS, the pressure supply unit and the pressurisation of different piston arrangements. Alternatively, the solenoid valves can be used in the case of an electric brake booster to control the master cylinder piston and pressure supply and connection.

The separation of the second housing unit has the advantage of the shorter connection holes of the aforementioned elements from the first housing unit to the second housing unit, wherein the e.g. valves for the pressure supply are positioned opposite.

It is particularly advantageous for the housing, in which the piston cylinder unit, the pressure supply unit, the valves of the valve arrangement and the control and regulating unit are arranged, to together have a width which is less than 70% of the height of the unit. A slim construction hereby results which can be arranged in the engine compartment in a space-saving and constructively simple manner. A shorter distance is then also appropriate when for example an electro-hydraulic clutch and gear actuator actuation device is provided adjacent to a brake system. A particularly narrow and rectangular construction of the hydraulic block is sought for such a system arrangement.

A particularly advantageous possible configuration of the previously-described actuation device is obtained when the housings in which the piston cylinder unit, the pressure supply unit, the valves of the valve arrangement and the control and regulating unit are arranged, together form a flat side wall which is facing e.g. at least one electronic component of a vehicle, in particular the vehicle battery, in particular is arranged parallel thereto.

The reservoir can similarly be arranged fully above with lateral connections directly to the suction inlets of the pressure supply. This avoids or reduces large holes in the housings. It is also possible for the reservoir to extend partly above and partly laterally along beside the piston cylinder unit, the pressure supply unit and the control and regulating unit. A channel can also be fastened, in particular welded or injection-moulded or formed on the reservoir which serves to connect to the piston cylinder unit, the pressure supply unit and/or the valve arrangement. Holes in one of the housings can hereby be advantageously dispensed with.

The control and regulating unit can thus also be arranged in an additional third housing unit which sits directly on the second housing and is connected thereto, wherein the magnetic coils functionally belong to the second housing unit.

The first housing, which receives substantially all pistons of the THZ, pistons of the pressure supply and the suction valves and also the path simulator, advantageously has a fastening flange for fastening to the bulkhead of a vehicle and pedal interface with pedal sensor actuation. The first housing is preferably produced in the pressure casting or continuous casting process and reworked for the piston guide of the pressure supply unit and the actuation piston of the brake pedal unit. The end caps have to be hereby mortised at the end when a hole has to be sealed.

The second housing, which receives in particular the valve arrangement with its solenoid valves, non-return valves, orifices and pressure sensors, is caulked or press-fitted to fasten in particular with the easily flowable material, e.g. aluminium. The second housing can also optionally receive a part of the pressure supply piston.

The first housing unit and the second housing unit can also be configured as one part or the two housing parts can also be connected in a joining process preferably prior to processing the piston cylinder guides.

It is advantageous for the sensor actuation devices to be housed in the first or second or both housings, said sensor actuation devices transfer the movement of the pedal and the rotor to a rotatable target (e.g. magnet), wherein the sensor evaluating element is positioned directly on the system circuit board or connected thereto. Additional cables, plug connectors or circuit boards (PCB) are hereby not necessary for receiving the protective and evaluation circuit, e.g. the Hall element.

An electrical connecting element (plug) connected to the vehicle's electrical system is preferably arranged above with horizontal plug-in direction, in particular below the reservoir. This position is easily accessible and a short cable length to the vehicle's electrical system for the cable set with right-angled outlet. The plug-in direction can preferably be selected or provided such that it is aligned to the vehicle outer side and not in the direction of the vehicle centre.

The hydraulic connecting lines to the wheel brakes are attached on the front from the perspective from the vehicle space and are therefore easily accessible for left-hand drives and right-hand drives and allow for simple installation tools.

Any occurring leakage through seals can be collected by means of a motor housing or leakage housing that is extended in its lower part and is sensed by means of an electrode. In the latter case, it is assumed that the level sensor of the brake fluid reservoir reacts in the case of a determined leakage volume.

Good ventilation of all hydraulic components (actuation via brake pedal or clutch pedal), in particular for the operation in fall-back level is important since during normal operation less favourable ventilation can be compensated by the controlling of the pressure supply. Good ventilation of the solenoid valve is also necessary for the PWM operation since the damping of the anchor movement is influenced thereby. To this end, it is necessary for the outlets of the connections of the wheel brake line to be higher than the corresponding solenoid valves to the pressure regulation of the wheels.

The position of the power parts on the PCB has a cost-increasing effect in the case of unfavourable implementation. In contrast, a position directly beside the plug and contact to the motor in the same region is advantageous.

The actuation of the motor generates power loss in the power part (MOSFET and driver). Heat dissipation to the housing unit is hereby advantageous and cost-effectively implementable. Since the brake operation lasts a relatively short time, large heat capacity of the housing unit is sufficient for heat dissipation.

During operation, structure-borne noise occurs by way of the motor bearings, KGT and actuation of the solenoid valves. To this end, the motor is connected to the housing unit via a damping plastic housing. The housing unit is, in turn, connected to the bulkhead by a separate flange made of plastic. An additional improvement is provided by mounting the flange in damping material (e.g. elastomers) in an adapter part to the bulkhead.

In order to significantly reduce an otherwise unavoidable spindle impact to and undesired transverse forces on the piston of the pressure supply device and in the best case to completely avoid them, an elastic flexible rod can optionally be arranged between drive and piston of the pressure supply unit in the case of the previously-described embodiments.

Possible embodiments of the actuation device according to the invention are described in detail below using drawings.

In the drawings:

FIG. 1 schematically shows a representation of the block of the most important elements;

FIG. 1*a* shows the corresponding side view;

FIG. 2 shows an alternative arrangement to FIG. 1;

FIG. 2*a* shows the corresponding side view;

FIG. 2*b* shows the sound-damping arrangement to the bulkhead;

FIG. 4 shows a perspective representation of a possible arrangement; and

Figure 3:
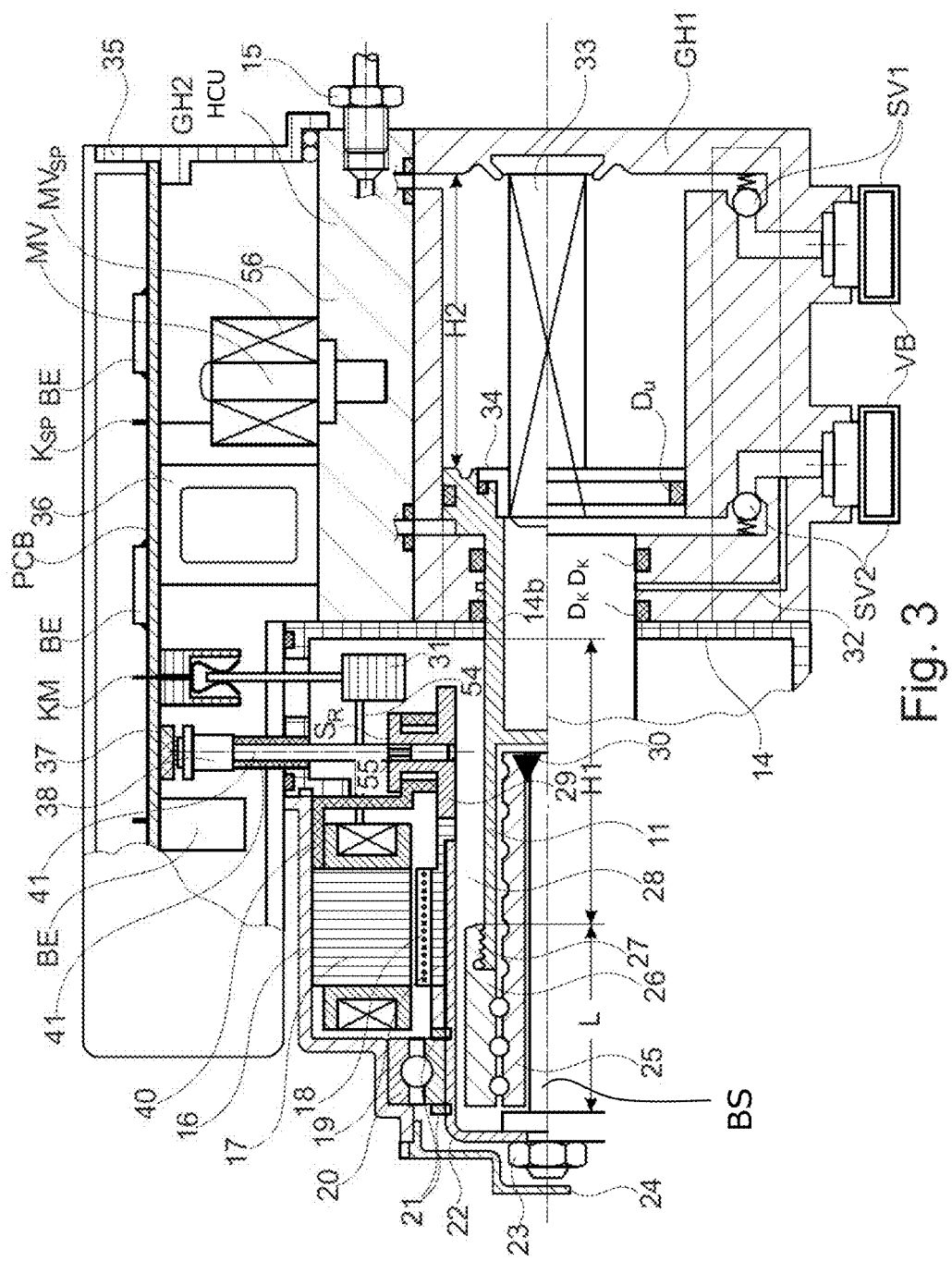
FIG. 3 shows a sectional drawing with motor, sensor, electric connection of HCU and ECU with magnetic coil, pressure piston with suction valves.

FIG. 4*a* shows a sectional drawing of a possible arrangement of components.

FIG. 1 shows a possible embodiment of the actuation device according to the invention for use in a vehicle for pressure supply of the vehicle brake system or a clutch and gear actuator. The motor M is in this case arranged on a second horizontal axis H1 parallel to the axis H of the first cylinder piston unit. The pedal plunger 26 acts on this axis H which can be connected to the brake pedal not represented. In addition to the motor M, the piston 11 of the pressure supply device can also be arranged on the axis H1.

The pedal interface P1 and the master cylinder arrangement 10 with the pressure pistons for the two brake circuits, e.g. usually a THZ or an arrangement corresponding to EP2015/068696 are also arranged in the main axis H. They are part of the housing unit GH1 together with the components of the pressure supply device, e.g. piston cylinder arrangement 11. The motor M, which drives the pressure supply device 11, is flanged to the first housing GH1. The valve arrangement HCU with front-side connections 15 to the wheel brakes and reservoir VB is positioned above or in the vertical direction. The control and regulating unit ECU with plug 1, which is connected to the PCB 25 via the contacts KS, is arranged below.

FIG. 1*a* shows the part section XX of the actuation device of FIG. 1. The control and regulating unit ECU designed in the cross-section in a U shape hereby comprises the housing unit GH1 from below, wherein the THZ piston 10 is arranged above the piston 11 of the pressure supply device. The valve arrangement HCU is arranged above the first housing GH1, said valve arrangement receives the solenoid valves MV with vertical axis $V_{MV}$ on both sides of the first housing GH1. The solenoid valves MV are electrically connected at their underside with the contacts $K_{SP}$ to the circuit board PCB of the control and regulating unit ECU. Alternatively to the front side, the plug 1 can also be arranged laterally on the control and regulating unit ECU. An extremely narrow design results by way of the previously-described features with the vertical stacking of control and regulating unit ECU, pressure supply device 11 and piston cylinder unit 10 and valve arrangement HCU. This also results in an extremely compact design with good ventilation of all hydraulic components.

FIG. 2 shows an alternative arrangement of the main components and housing structures with axis H1 of motor M and pressure supply 11 parallel to the actuation axis H, wherein the pedal plunger 26 here acts on the pedal interface P1 and said pedal interface is connected to at least one pressure piston and the pedal path sensor actuation device. Detail will not be given here on the sensors. Hall elements are usually used.

The motor M is connected via an intermediate part 14 made of sound-damping material to the housing unit GH1 by means of the fastening screw 14*a*. The high-frequency vibrations of motor M and piston drive e.g. KGT are reduced by the intermediate part 14. The first housing unit GH1 has an L-shaped construction in the cross-section in the case of this embodiment and is connected at the front side to the flange 13. Said flange is fastened to the front wall with screws 42.

The motor M acts with its drive preferably via KGT on the piston 11 of the pressure supply unit. A double stroke piston, which allows a particularly short construction length, is particularly advantageous here in the case of the piston solution since the piston stroke can be kept low in the case of continuous volume delivery via forward and return stroke. The double stroke piston has two suction valves SV1 and SV2 for forward and return stroke which are connected to the reservoir VB. Only one suction valve is necessary in the case of a single piston. The connections 15 are provided on the front side for the wheel brake cylinders whereby they are optimally accessible. The plug 1 is arranged above the first housing GH1 with preferably lateral outlet 2 of the cable set. A short cable length to the vehicle's electrical system is therefore possible. The reservoir VB extends partially over and beside the plug and on the rear side of the arrangement. This leads to the vehicle's electric system box located in front or behind the spring dome. The foregoing is represented more comprehensibly in FIG. 2*a*, the view of pedal plunger in direction x.

The first housing unit GH1 is represented on the right in FIG. 2*a* which receives the piston cylinder unit 10 (axis H) and the pistons 11 (axis H1) of the pressure supply unit.

Piston cylinder units 10, 11 are preferably arranged on a vertical axis and the path simulator WS and the switching valves SV1, SV2 are arranged at the shortest possible distance from the valve arrangement HCU which substantially receives the solenoid valves MV and the pressure sensor(s). In accordance with the system design, approx. 10-25 solenoid valves MV are necessary for the ABS/ESP pressure regulation, the controlling of the pressure supply device 11 and the piston cylinder unit 10 and the path simulator WS. To this end, non-return valves must be provided from the piston cylinder unit to the reservoir VB and pressure sensors. Only small hole lengths are necessary due to the arrangement according to the invention when e.g. the solenoid valve MV connected to the path simulator circuit is arranged beside the path simulator piston. Low costs and current resistances are therefore achieved. The control and regulating unit ECU is flanged beside the valve arrangement HCU, the circuit board PCB 25 of said ECU is connected via the coil contacts $K_{SP}$ to the solenoid valve coils. The motor M is also connected with the electric connecting element 12 to the circuit board PCB. This arrangement is described in detail using FIG. 3.

It has already been mentioned that detail is not given here on the sensor description of pedal path, motor rotation, level of the hydraulic fluid. It should be the aim for all sensor elements to be arranged on the system circuit board PCB 25 and the targets of the sensors to be arranged in proximity to the system circuit board and to be a short distance from the system element (<5 mm). The plug part provided with the contacts is preferably connected here via so-called press-in contacts to the PCB. The plug 1 is inserted laterally with the usual mechanics. It is particularly easily accessible at the point shown in FIGS. 2 and 2a. The reservoir VB has a recess in the plug region 1. The hydraulic consumer connections, in particular wheel brakes 15 can be arranged both on top of one another in the vertical direction and beside one another horizontally. In the case of horizontal arrangement, connection holes must be provided in the first housing.

The two housing parts GH1 and GH2 can together form a housing or be designed separately.

The actuation device can be fastened to the front wall of the vehicle by means of the housing flange 13. In this case, so-called "front bolted" screws can be used easily accessible on the right-hand side and "rear bolted" screws on the left-hand side of the flange. It is sufficient for e.g. only one screw "front bolted" to be accessible i.e. from the front of the vehicle. All installation possibilities can therefore be implemented.

Since, as is well know, any seal can leak and the leakage may no longer appear on the outside, a leakage reservoir 50 can be formed on the underside of the first housing GH1, e.g. combined with 14c.

The heat from the circuit board PCB and the electronic components can be dissipated via a heat-conducting body 26 to the valve arrangement HCU. The control and regulating unit ECU can be designed flat or, in the case of a larger space requirement for the circuit board, below at right angles.

To assess the construction space gained, the outline contour of the small vacuum BKV is drawn in here. An additional volume for electric units, such as e.g. a battery results on the right-hand side. This construction space gained is particularly important for right-hand drives since the transversely-located motor requires significant space.

The path simulator of the brake system with pistons and springs can also be housed in the housing part GH1 or GH2. The path simulator can be arranged axially-parallel to the axis of the main cylinder and also perpendicular thereto.

The outline contour 52 of the 2-chamber vacuum brake booster with a section of the THZ (e.g. small vacuum booster with 9" diameter) is represented in a dot-dashed manner in FIG. 2. The possible space gained by the arrangement according to the invention is immediately obvious. A construction length gain of almost 50% and in the case of BKV of almost 40% is possible here. The outline contour of the small vacuum BKV with approx. 9" is represented in FIG. 2a as circle 51. The notable construction space gained of the brake booster according to the invention is clear determined by the housing parts GH1 and GH2 with reservoir VB.

FIG. 3 shows a transverse representation of the motor, drive, the pressure supply device DK, valve arrangement HCU and the control and regulating unit ECU with its essential components. The representation is a mirror image of the representation according to FIG. 2.

The motor housing 16 is connected via the intermediate part 32 made preferably of sound-damping material to the first housing part GH1, wherein the centring can take place via projection 14b. Motor housing 16 and intermediate part 14 and ECU housing 35 are sealed, e.g. with surfaces shaded at right angles which are not described individually. A four-point bearing 20 is pressed in the motor housing 16 which receives the axial forces in both directions from the spindle 25 and rotor 22 and centres them. The rotor 22 is secured via an axial support 29 and carries the other rotor sheets 19 with magnets 20 in the stator region.

The rotor 22 is also connected on the front side to a cone gear wheel 28 which drives the second cone gear wheel 29 with shaft 41 and target 38. This acts on the sensor element 37 which evaluates the rotor rotation. The sensor element in this case sits on the system circuit board PCB and is particularly cost-effective and interference-free. Alternatively to the mechanical solution, a solution, not represented, can be implemented in the case of which the rotor, instead of being connected to a cone wheel, is connected to a sleeve which contains the magnets and therefore forms the target 38 for the evaluation of the rotational angle of the motor. The target magnetic field can in this case be detected by corresponding arrangement of the sensor element in proximity to the target (e.g. by plug connection to the ECU) or be guided via magnetic flow conductive elements to the remote sensor element on the PCB.

The cone gear wheel 29 is mounted in a housing 40 which is connected to the motor housing 16. The gear wheel 20 is mounted in the housing with radial clearance SR so that the flexible drive shaft 41 does not generate any tooth clearance with corresponding tensioning. The shaft is in this case mounted in the bearing bushing 41 which is fastened in the intermediate part 14. The shaft 41 is connected in a torque-proof manner to the gear wheel 29, e.g. via a corresponding profile with rotation lock. The flexible rod BS is fastened on the rotor 22 via the nut 23. It is connected in a torque-proof manner to the spindle 25, e.g. by means of a weld 30. The spindle 25 acts on the KGT nut 26 which is connected in a torque-proof manner to the piston 11 via e.g. a thread 27. In the case of the rotation of rotor and spindle, the radial tolerances cause a spindle impact which generates correspondingly high transverse forces on the piston which are critical for the running surfaces of the seals DK. The bending elasticity of the flexible rod BS reduces this to a small value. This principle can also be applied in the case of a fixed spindle and circumferential nut not represented. The piston is designed here as a stepped piston and provides a short construction length in the case of short stroke. As the sectional drawing illustrates, the construction length is composed of stroke H1+H2=2×H1+L of KGT nut. Since this is inside the motor corresponding to DE 10 2008 063 772 from the applicant, a hollow shaft motor, the actual motor construction length, which is composed of stator and bearing, is not included in the construction length. The clearance of the stroke portion H1 is not used for the leadframe 31 of the winding that is connected to the winding wires. In addition, the motor sensing 28-29 can still be housed here, as already mentioned.

The piston is sealed via three seals DK in order to seal the corresponding pressure chambers about which no further detail is given, nor the design of the intermediate part 14 and GH1 which is optimal for this purpose.

The KGT nut with piston requires a rotation lock which is applied on the front side here. A corresponding part 33 with square or multi-edged profile is connected in a torque-proof manner to GH1 and is supported on a slide bearing 34 which is connected in a torque-proof manner to the piston. This sliding guide benefits from the small lubricating effect of the brake fluid. The piston drive can also be designed with fixed spindle and rotating KGT nut. The suction valves SV1 and SV2 are housed on the one side of the GH1 which are connected with corresponding connections to the VB. As indicated in a dot-dashed manner, they can be arranged on the H2 plane in a tubular element. The GH2 HCU is arranged on the opposite side, which, as described, receives the MV and other valves with pressure sensors. Very short connection holes of GH1 and GH2 are clearly discernible above and also below here.

The ECU housing is connected to the GH2 which receives the PCB with the structural elements BE. The short connection to the motor from leadframe 31 to motor contact $K_M$ is also described here, in whose proximity to the PCB are arranged the power contacts of the plug 1 with the BE to the motor controller. The corresponding power loss is dissipated by the PCB via a heat-conducting body to the valve block 56 of the HCU. The ECU housing 35 can be designed parallel and laterally to the motor. This arrangement allows an advantageous compact solution to be implemented cost-effectively which takes into account many requirements.

FIG. 4 shows in perspective representation particularly clearly the compactness of the arrangement in the embodiment for an E-BKV in the case of which the ABS/ESP unit is arranged outside in the unit compartment. This is why only two hydraulic lines for the two brake circuits of the ABS/ESP unit are labelled with 15a in comparison to four to the wheel brakes in the case of the integrated version, as represented in FIG. 2, 2a. Essential differences in the arrangement of the main components motor with pressure supply corresponding to FIG. 3, housing unit GH1 and GH2 and ECU do not exist for AX5 such that both versions can be modularly built and manufactured. The number of components in ECU, GH2, e.g. solenoid valves and GH3 design of the pistons of the pressure supply only differ with the number of suction valves.

The plug is shows only the so-called male part connected to the ECU. The reservoir is connected only to a suction valve SV1. The second connection THZ with the main cylinder in the housing flange is a screw 42 front bolted for fastening from the front and the other 1 to 3 in the case of 42r are provided as rear bolted.

FIG. 4a shows the arrangement of the hydraulic circuit board HLP50 between the housing parts GH1 and GH2 which are screwed together. This replaces the many holes and blind stops at the outlet of a hole in the valve block with corresponding channels. They are necessary for connecting the hydraulic lines from e.g. THZ, pressure supply, solenoid valves. The HLP reduces the number, in particular length, and enables a thinner valve block (GH2) which saves weight. For sealing, lip seals D1 or rectangular seals can be used which are preferably injection-moulded to the HLP.

What is claimed is:

1. An activation device for a hydraulic activation system of a vehicle, the activation device including:
    a connection for an activation device, in the form of a brake pedal or a clutch activation device,
    a pressure supply device, driven by an electric motor drive, in the form of a piston pump or a double-stroke piston pump, wherein
    the electric motor drive adjusts the piston of the piston pump or double-stroke piston pump directly or via a transmission gear unit,
    a piston-cylinder unit enabled to be activated by the activation device and hydraulically connected to a pressure medium reservoir vessel, and
    an electronic open-loop and closed-loop control unit,
    wherein a connection element is enabled to be plugged into the control unit in a horizontal plugging direction, and
    wherein the connection element is arranged above the piston-cylinder unit, and
    wherein the connection element is arranged above a first housing, wherein the first housing accommodates the piston-cylinder unit and the piston of the pressure supply device.

2. The activation device according to claim 1, wherein the horizontal plugging direction points in a horizontal direction away from an axis of the piston-cylinder unit and towards the control unit.

3. The activation device according to claim 1, wherein the electric motor drive is arranged underneath an axis of the piston-cylinder unit.

4. The activation device according to claim 1, wherein the electric motor drive is attached to the first housing and is arranged underneath an axis of the piston-cylinder unit.

5. The activation device according to claim 1, wherein the plugging direction is oriented with respect to an outside of the vehicle and not in a direction of a centre of the vehicle.

6. The activation device according to claim 1, wherein the connection element is arranged above the electric motor drive.

7. The activation device according to claim 1, wherein the pressure medium reservoir vessel extends partially next to the connection element.

8. The activation device according to claim 1, wherein the pressure medium reservoir vessel extends partially over and next to the connection element and on a rear side of the activation device.

9. The activation device according to claim 1, wherein the pressure medium reservoir vessel has, in one region, a recess for the connection element.

10. The activation device according to claim 1, wherein the connection element is mounted, to enable connection to an on-board power system of the vehicle, laterally next to the control unit or on a front face of the control unit, and partially under a projection of the control unit and/or the pressure medium reservoir vessel.

11. The activation device according to claim 1, wherein a part of the control unit is arranged above a valve arrangement and/or the first housing.

12. The activation device according to claim 11, wherein the pressure medium reservoir vessel is arranged or extends above the piston-cylinder unit and/or above the part of the control unit.

13. The activation device according to claim 1, wherein an area of the pressure medium reservoir vessel extends laterally downward next to the first housing, and wherein the area of the pressure medium reservoir vessel has hydraulic connections configured for connection to inlet and outlet ducts of the first housing.

14. The activation device according to claim 1, wherein the transmission gear unit comprises an epicyclic ball transmission.

* * * * *